United States Patent

[11] 3,620,500

| [72] | Inventor | Louis S. Santomieri<br>Benicia, Calif. |
|---|---|---|
| [21] | Appl. No. | 8,578 |
| [22] | Filed | Feb. 4, 1970 |
| [45] | Patented | Nov. 16, 1971 |
| [73] | Assignee | Deseret Pharmaceutical Company, Inc.<br>Sandy, Utah |

[54] VARIABLE APERTURE FLUID FLOW CONTROL APPARATUS
2 Claims, 7 Drawing Figs.

[52] U.S. Cl. .................................................. 251/149.1,
251/331, 138/45, 128/348
[51] Int. Cl. .................................................. F16l 29/00,
F16k 7/00
[50] Field of Search .......................................... 251/149.1,
331, 120, 121; 138/45; 128/348, 349; 137/1

[56] References Cited
UNITED STATES PATENTS

| 997,124 | 7/1911 | Garcia | 251/331 X |
| 1,550,305 | 8/1925 | Dreischerf | 251/331 X |
| 2,596,947 | 5/1952 | Turkel | 128/348 |
| 2,670,625 | 3/1954 | Snavely | 251/331 X |
| 3,095,175 | 6/1963 | Iketani | 138/45 X |

Primary Examiner—William R. Cline
Attorney—Lynn G. Foster

ABSTRACT: A device and method for controlling the rate of fluid flow through an intravenous infusion tube or the like by varying the dialation of an opening in a diaphragm, and maintaining the dialation without constant attention, the dialation being controlled by the relative position of a male fitting within a female fitting.

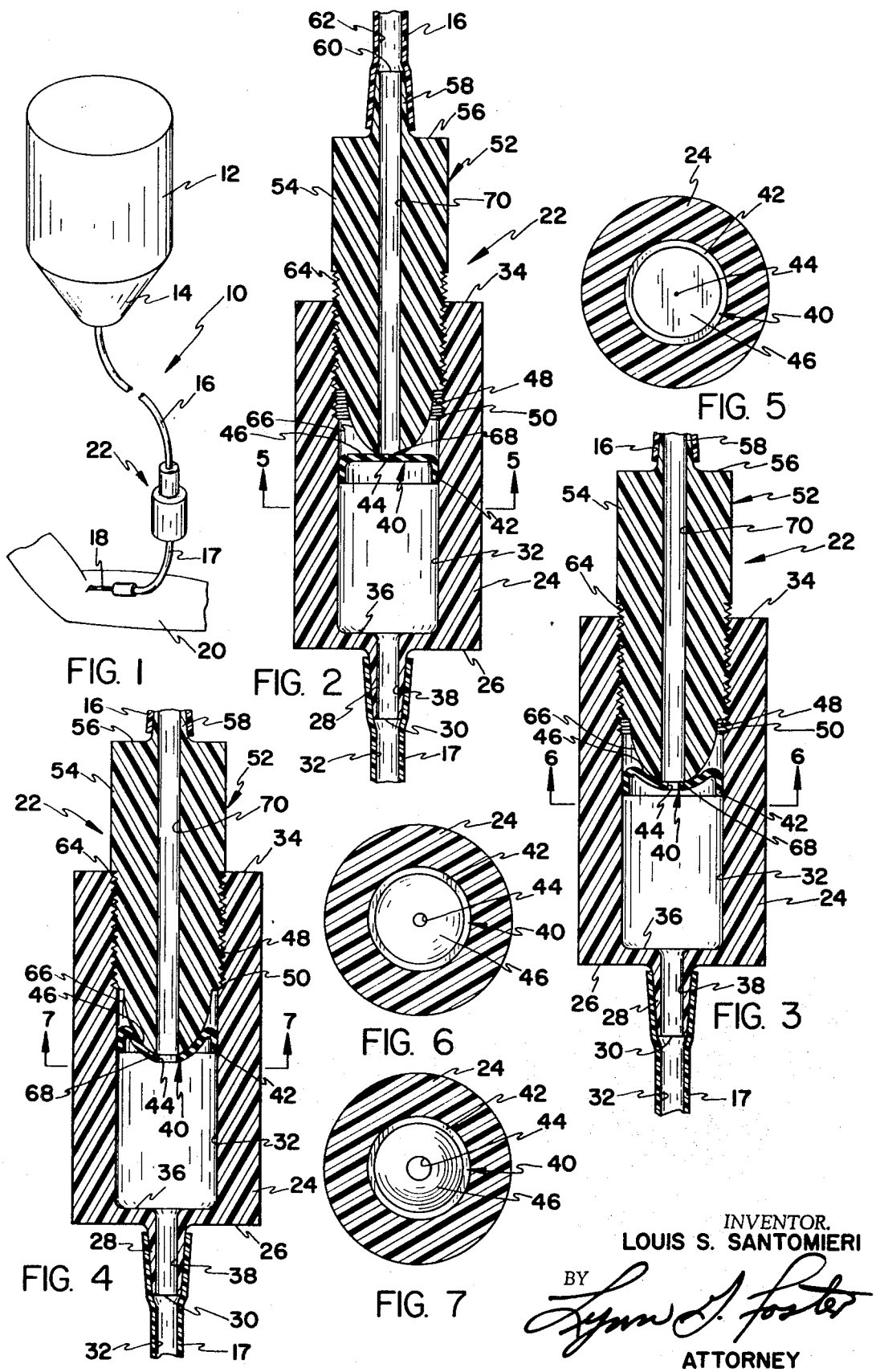

3,620,500

VARIABLE APERTURE FLUID FLOW CONTROL APPARATUS

BACKGROUND

1. Field of the Invention

The invention relates to controlling intravenous fluid flow and more particularly to device and method for setting a desired flow rate for fluids which can be gauged by the number of drops of flow per unit of time.

2. The Prior Art

It is common practice in medically treating a patient to introduce fluids into the body of the patient by intravenous infusion and the like. The rate at which the fluid is infused into the body is often critically important, particularly when the fluid includes medication.

Historically, the flow of fluid through an infusion assembly has most commonly been controlled by a cylindrical disk placed above a ramp surface. The flexible catheter or infusion tubing comprising part of the infusion assembly is interposed between the ramp surface and the disk. When the disk is rolled or otherwise displaced relative to the ramp surface, the infusion tubing is partially collapsed to limit fluid flow.

It has been found that conventional fluid control devices do not consistently allow a uniform rate of fluid flow through the infusion tube. Any inadvertent movement in the infusion tube can cause the flow rate to change. Also, repeated attempts are often required to establish a desired flow rate because movement of the disk relative to the ramp is not uniformly controlled but, on the contrary, controlled only at an arbitrary rate determined by the feel or touch of the physician or technician attending the infusion apparatus.

BRIEF SUMMARY AND OBJECT OF THE INVENTION

It is a primary object of the present invention to alleviate or overcome problems of the mentioned type.

The present invention comprises device and method for varying the size of a fluid conducting aperture so that a precise intravenous flow rate may be set and easily maintained.

It is another important object of the present invention to provide a novel intravenous or like flow control device.

Another, and no less important object of the present invention, is the provision for an improved method for precisely controlling the rate of fluid flow to or from a patient.

These and other objects and features of the present invention will become more fully apparent from the following description and appended claims taken in conjunction with the accompanying drawings wherein:

BRIEF DESCRIPTION OF THE DRAWINGS

FIG. 1 is a schematic perspective view of an infusion assembly including the flow control device comprising part of the present invention;

FIGS. 2–4 are cross section elevations respectively illustrating the presently preferred embodiment of the invention in various flow control conditions; and FIGS. 5–7 are transverse cross-sectional views respectively taken along lines 5—5, 6—6, 7—7 of FIGS. 2-4.

DETAILED DESCRIPTION OF THE PREFERRED EMBODIMENT

Structure for Controlling Fluid Flow

Reference is now made to the FIGURES wherein like parts are designated with like numerals throughout. Attention is particularly directed to FIG. 1 which schematically illustrates an infusion assembly generally designated 10 and comprises a dispensing bottle 12 which conventionally includes a hanging bracket (not shown) and has a conically tapering neck 14 which terminates in a coupling stopper (not shown) into which the infusion tube 16 is coupled. Normally, the stopper includes an air passage way which allows air to flow into the bottle 12 as fluid flows out of the bottle 12 into the infusion tube 16. If desired, the bottle 12 may be collapsible plastic, as is common, and may be filled with blood, isotonic saline, or other infusion liquids. Commonly, medication is dissolved within the liquid carried by the bottle 12 so that the medication may be distributed to a patient uniformly over a relatively lone period of time.

The infusion tube is connected such as by tube 17 to an infusion needle 18 which is normally inserted into a vein in the arm 20 of a patient. If desired, a conventional catheter may be substituted for the needle 18 and the tube 17.

Conventionally, a drip chamber is disposed between the infusion tube 16 and the tube 17 so that the rate of flow of fluid from the bottle 12 into the patient's arm 20 can be visually observed. Although the present invention may be utilized along with a drip chamber, it is presently preferred that the present fluid control device generally designated 22 be substituted for the drip chamber. The fluid control device 22, best shown in FIG. 2, comprises a female fitting or coupling 24 which, as shown in FIG. 2, is cylindrical in configuration having an essentially planar end 26. A downwardly directed projection 28 tapers inwardly from the end 26 to the terminal tip 30 of the projection 28. Projection 28 is adapted to be press fit into the hollow 32 of the lower catheter or infusion tube 17.

The female fitting 24 has a central bore 32 which opens at the upper end 34 to the exterior of the fitting 24 and terminates at the lower end in an annular shoulder 36. A bore 38 having a reduced diametral dimension opens into the bore 32 at the shoulder 36 and also to the exterior of the fitting 24 at the tip 30. Thus, a flow passage exists in the female fitting 24 through the bores 32 and 38. The projection 28 and the bore 38 comprises an egress port from the bore 32 to the tube 17.

A resiliently flexible diaphragm 40 formed of material with memory, such as rubber, is bonded or otherwise suitably joined around the entire periphery of the bore 32. As shown n FIG. 2, the diaphragm 40 has a downwardly turned lip 42 accommodating surface to surface engagement of the diaphragm 40 with the female fitting 24 so that a strong and reliable bond can be formed between the diaphragm 40 and the female fitting 24. Also, as shown in FIG. 2, the location of the diaphragm 40 is spaced substantially above the annular shoulder 36 so that a chamber is formed therebetween. The female fitting 24 is preferably formed of transparent synthetic material so that fluid passing through diaphragm 40, as will be hereafter more fully described, can be visually observed as it falls from the diaphragm 40 toward the annular shoulder 36. If desired, filtering material may be disposed in the bore 32 adjacent the shoulder 36 to filter fluid passed through the diaphragm 40.

Diaphragm 40 has an aperture 44 coincident with the axis of the bore 32. As shown in FIG. 5, the aperture 44 in the at rest condition, is too small to allow liquid to flow therethrough. In the at rest condition illustrated in FIG. 2 and 5, the central portion 46 of diaphragm 40, which central portion is disposed laterally across the aperture 32, is essentially horizontal in configuration.

The portion 48 of the bore 32 which is nearest the upper end 34 is provided with internally directed threads, the threaded portion 48 commencing at the upper end 34 and terminating at 50, the termination point being spaced somewhat above the diaphragm 40. The threaded portion 48 receives the male fitting generally designated 52.

Male fitting 52 preferably comprises a cylindrical body 54 having a substantially planar trailing end 56. The trailing end 56 has an upwardly directed projection 58 which tapers inwardly from the end 56 and terminates in tip 60. The projection 58 comprises an ingress port and resembles closely the projection or egress port 28. The trailing end 56 is normally press-fit into the hollow 63 of the infusion tube 16 as illustrated in FIG. 2.

Body 54 has an intermediate threaded portion 64 having exterior threads which mate with the threaded portion 48 of the female fitting 24. Thus, as the male fitting 52 is threaded into the female fitting 24, the male fitting will advance into the bore 32 at a relatively uniform rate determined by the pitch on the threads.

The leading end 66 of the male fitting 52 is smoothly tapered forwardly and terminates in a blunt end 68. An axially aligned bore 70 is disposed through the entire length of the male fitting 52 from the blunt end 68 to the tip 60. The bore 70 is adapted to communicate fluid in the infusion tube 16 to the diaphragm 40 which is exposed to the bore 70 at the blunt end 68. Importantly, the presently preferred embodiment of the invention has the axis of bore 70 coextensive with the axis of aperture 44 in diaphragm 40.

Method of Controlling Fluid Flow

In the method of controlling the flow of fluid from the infusion tube 16 to the catheter or infusion tube 17, it can be appreciated that male fitting 52 is threadedly engaged in the female fitting 24 until the blunt end 68 of the male fitting just touches the diaphragm 40. When diaphragm 40 is in the at rest position illustrated in FIG. 5, no fluid will flow through the aperture 44.

When desired, the male fitting 52 may be advanced by rotating the male fitting relative to the female fitting 24. Advancement of the male fitting 52 will deform the central portion 46 of the diaphragm 40 as illustrated in FIG. 3. The deformation is a result of tensile load being exerted upon the diaphragm 40 through the male fitting 52. The deformation of the diaphragm 40 will cause the aperture 44 to dialate somewhat as shown in FIG. 6. Dialation of aperture 44 will then allow a restricted volume of fluid to flow from the tube 16 through bore 70 and into the bore 32 of the female fitting 24. Thereafter, fluid will flow through the egress port 28 and into the tube 17 to be thereafter conducted to the arm 20 of the patient (see FIG. 1).

Clearly, the amount of dialation of the bore 44 is a direct function of the axial position of the male fitting 52 relative to the female fitting 24. The amount of dialation determines the rate at which fluid will flow into bore 32. Over a range of dialation amounts, the fluid will flow in a continuous series of drops, the volume of each drop being known so that in a known time increment, the rate at which the drops fall into bore 32 may be used to determine the volume of liquid passing into tube 17. Thus, a nurse or physician can determine the volume of intravenous fluid administered to a patient by merely advancing the male fitting 54 against the diaphragm 40 until the drops fall at the proper rate.

When the male fitting 52 has advanced to the maximum limits, i.e., when the threaded intermediate portion 64 reaches the termination point 50 of the threads in the female fitting 24, the aperture 44 in the diaphragm 40 will be dialated to the maximum extent. Thus, aperture 44 will have a diameter at least as large as the diameter 70. Nevertheless, the termination point 50 and the engagement of the body portion 54 with the upper end 34 of the female coupling 24 prevents the male fitting 52 from advancing too far and damaging the diaphragm 40.

From the foregoing, it can be appreciated that the rate of fluid flow from the tube 16 to the tube 17 will depend on the degree of dialation of the aperture 44 in the diaphragm 40. The degree of dialation of aperture 44 is a direct function of the position of the male fitting 52 relative to the female fitting 24. The relative position of the male and female fitting 52 and 24, respectively, can be changed only by rotating one relative to the other. Thus, inadvertent movement of the infusion assembly 10 will not significantly contribute to a change in fluid flow rate through the diaphragm 40.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. In a device for controlling the flow rate of fluid in an infusion assembly, the improvement comprising:
   a resilient deformable diaphragm having an aperture normally too small to pass fluid;
   a generally hollow transparent female fitting having fluid egress means and internally receiving the diaphragm in fluid tight relation at a point spaced from said egress means comprising a passage in essentially axial alignment with the aperture so as to define a drip chamber within said female fitting; and
   a male fitting threadedly coupled into the female fitting adjacent the diaphragm and having fluid ingress means, the male fitting accommodating advancement into the female fitting to induce a tensile load in the diaphragm and to maintain the induced load when the advancing force is removed thereby dialating the aperture a preselected amount whereby a known volume of fluid is transferred by the ingress means to the egress means in a predetermined time period.

2. A catheter assembly comprising:
   a flexible tube for communicating intravenous fluid to a patient;
   a catheter at one end of the tube for placement in the venous system of the patient;
   a flow-regulating mechanism interposed between the ends of the flexible tube, the flow-regulating mechanism defining a generally linear flow path essentially axial with the flow path of the flexible tube and comprising threadedly connected male and female coupling members, the threads being disposed at respective adjacent overlapping ends of the male land female coupling members, a yieldable diaphragm sealed to the interior walls of the female member and spanning therebetween across a hollow interior thereof, the diaphragm comprising a closed slit when in an unstressed condition, one end of the male coupling member being juxtaposed the diaphragm and comprising a rounded configuration without sharp edges, the male coupling member defining a central axial passageway which opens within the female coupling member at the rounded end of the male coupling member adjacent the slit in the diaphragm, whereby thread advancement of the male coupling member with respect to the female coupling member engages, displaces and stresses the diaphragm proportional to the amount of said advancement, bringing the diaphragm into corresponding rounded configuration with the round end of the male coupling member to the extent that the two become contiguous and the slit is opened and fluid is able to flow therethrough to a regulated degree proportional to said advancement.

* * * * *